United States Patent [19]
Thornton

[11] Patent Number: 5,847,754
[45] Date of Patent: Dec. 8, 1998

[54] HIGH RESOLUTION FILM SCANNER/ TELECINE WHICH USES A MICROLITHOGRAPHIC DIFFUSER LAMINATE TO AID IN THE REDUCTION OF VISIBILITY OF SURFACE IMPERFECTIONS IN THE FILM

[75] Inventor: Shane Thornton, Barrington, United Kingdom

[73] Assignee: Rank Cintel Ltd., United Kingdom

[21] Appl. No.: 461,712

[22] Filed: Jun. 5, 1995

[30] Foreign Application Priority Data

Apr. 7, 1995 [GB] United Kingdom ............... 9507284

[51] Int. Cl.[6] ............... H04N 3/36; H04N 5/253; H04N 9/11; H04N 9/47
[52] U.S. Cl. ............... 348/97; 348/98; 359/17; 359/28; 359/30
[58] Field of Search ............... 348/96, 97–100, 348/112, 110; 358/479, 487; 359/3, 5, 6, 9, 17, 24, 28, 30

[56] References Cited

U.S. PATENT DOCUMENTS

| | | | |
|---|---|---|---|
| 4,317,876 | 3/1982 | Haering | 430/293 |
| 4,521,771 | 6/1985 | Altin | 340/705 |
| 4,877,480 | 10/1989 | Das | 156/635 |
| 4,923,772 | 5/1990 | Kirch et al. | 430/5 |
| 5,012,346 | 4/1991 | DeJager et al. | 358/214 |
| 5,300,942 | 4/1994 | Dolgoff | 345/32 |
| 5,302,820 | 4/1994 | Henshaw et al. | 250/231.16 |
| 5,337,164 | 8/1994 | Yabe et al. | 358/487 |
| 5,372,901 | 12/1994 | Rolfson et al. | 430/5 |
| 5,376,961 | 12/1994 | Galt et al. | 348/105 |
| 5,387,484 | 2/1995 | Doan et al. | 430/5 |
| 5,467,172 | 11/1995 | Liao | 355/231 |
| 5,521,030 | 5/1996 | McGrew | 430/1 |
| 5,644,356 | 7/1997 | Swinson et al. | 348/96 |

FOREIGN PATENT DOCUMENTS

| | | |
|---|---|---|
| 1532400 | 11/1978 | United Kingdom . |
| 1597504 | 9/1981 | United Kingdom . |

OTHER PUBLICATIONS

*TV & Video Engineers Reference Book,* Chapter 39, "Telecines", J.D. Millward B Sc, C Eng., MIEE, Edited by K.G. Jackson & G.B. Townsend, ISBN 0-7506-1021-2, pp. 39/1–39/12.

*The Focal Encyclopaedia of Film and Television Techniques,* "Callier Effect.", ISBN 0-240-50654-5.

URSA Gold brochure, Rank Cintel Limited, Jun. 27 and Aug. 8, 1995.

The ADS 2 brochure, Rank Cintel Limited, Jan. 9, 1992.

*Primary Examiner*—Douglas W. Olms
*Assistant Examiner*—David R. Vincent
*Attorney, Agent, or Firm*—Ostrolenk, Faber, Gerb & Soffen, LLP

[57] ABSTRACT

A high resolution film scanner or telecine uses a microlithographic diffuser laminate (24) arranged adjacent the film. The diffuser diffuses a collimated light beam produced from a light source and the optics of a film scanner or telecine. This type of diffuser is inexpensive, yet produces a more uniformly distributed light intensity and aids in the reduction in visibility of surface imperfections such as scratches on the scanned film.

61 Claims, 7 Drawing Sheets

HIGH RESOLUTION FILM SCANNER/ TELECINE WHICH USES A MICROLITHOGRAPHIC DIFFUSER LAMINATE TO AID IN THE REDUCTION OF VISIBILITY OF SURFACE IMPERFECTIONS IN THE FILM

FIELD OF THE INVENTION

This invention relates to film scanners and in particular to diffusers for film scanners. The invention is also applicable to apparatus which includes film scanners such as telecines and the like.

BACKGROUND TO THE INVENTION

The scanning of movie film to convert the images into an electrical signal is typified by television telecine scanners such as the URSA Gold and ADS 2 telecines manufactured by Rank Cintel Limited of Ware, Hertfordshire, England. The techniques used to scan film for television applications employ either rastered light systems, such as may be produced by a Cathode Ray Tube and scanning system in conjunction with a photosensitive detector, or use a high intensity light source and solid state sensors such as line array and area array Charge Coupled Devices.

These techniques are well known in the art and are described, for example, in "TV & Video Engineers Reference Book" Chapter 39, Edited by Dr B. Townsend, Published by Butterworth & Heinemann ISBN 0-7506-1021-2. Solid state sensor telecines are also described in British patents GB-A-1,532,400 entitled "System for Scanning Films for Reproduction by Television", and GB-A-1,597,504 entitled "Single line Scanning of Motion Picture Film".

Apart from scanning movie film using a telecine there is also a need to convert film images into electrical data for use in the print industry, for computer graphics, for clinical and research medicine applications, for military and security applications, for industrial process applications, broadcast television stills applications, and for other purposes. More recently, the scanning of film for conversion into digital data has been undertaken at resolutions approaching the limits of film materials for electrical processing and then relaying back to film—the so called digital film process used extensively in modern movie production for special effects work. These film scanners alluded to are almost all devices which use solid state line array sensors of one form or another, and consequently employ a light source and optics path to illuminate the film prior to the sensor mechanism itself. An example of such a film scanner is described in out British patent application GB 9401907.2 entitled High Resolution Film Scanner Mechanism, and in our corresponding U.S. application, Ser. No. 08/382,361, filed 1st Feb. 1995 and claiming priority from the aforementioned application, and the content of which is incorporated herewith in its entirety by reference. The subject matter of our earlier application is embodied in our Klone (TM) Very High Resolution Film scanner.

In known film scanners it is usual to use a collimated light beam to scan the film for reasons of light collection efficiency. This presents a problem as collimated beams tend to accentuate the contrast between light and dark in the film due to the specular nature of the incident light producing the well known and understood Callier Effect of photographic printing. The Callier Effect is described in many text books on photography for example "The Focal Encyclopedia of Film & Television Techniques", ISBN 0 240 50654 5.

Another disadvantage of using a highly collimated light to illuminate the film is that it will also accentuate any surface damage or blemishes on the film such as typified by scratches or fine particle dust. The specular light will accentuate the hard outlines of these blemishes as it travels straight through the film to the imaging lens, whereas it is a well understood phenomena of the silver halide/dye particles of film that they will scatter and diffuse the penetrating light on its path through the film and thus proportionately less will be collected by the imaging lens.

It is well known to alleviate the above mentioned disadvantages of collimated light beams by using a diffuser to diffuse the source of light before it enters the film. The diffuser ensures that a wide range of light angles are incident on the film simultaneously. This increases the probability that some of them will eventually reach the imaging lens and thence be imaged onto the photosensor(s). This has the dual advantage of reducing the visibility of scratches and blemishes, and giving a more faithful reproduction of the tonal gradations within the film image. This increase in tonal gradation is offset by a proportional loss of contrast resulting from there being less specular light being available at the film plane. However, this contrast loss can be compensated by a proportionate increase in illumination power or a increase in light gathering time at the photosensor(s).

The classic optical diffuser is a ground glass screen. However, while ground glass diffusers are satisfactory for conventional definition scanners, we have appreciated that they have two major drawbacks when used with very high resolution scanners. Firstly, a ground glass screen in the optical path causes a very high attenuation of the available light to illuminate the film. This is an especial disadvantage with very high resolution scanners which require a high intensity light source. Dependent upon the glass material and the coarseness of the ground surface the attenuation losses could amount to 60–70%, i.e. only 30–40% of incident light is transmitted. Clearly such losses are undesirable. Secondly, the diffusion media needs to be close to the film to avoid light loss and consequently close to or in contact with the image plane. As a result any texture of the diffusion media, such as the ground glass surface, can be superimposed on the sensed film image. Typical ground glass screens have a 10 m granular texture which would get resolved via the imaging lens, and the photosensor(s). Clearly imprinting such a texture on the film image is undesirable.

Diffusion may be introduced into a scanner by using an integrating volume such as a sphere, box, or cylinder. These volumes are inherently inefficient but create a diffuse light source without a diffusing structure near the film plane. As integrating volumes are so inefficient they require high electrical input power to expose the film.

We have appreciated that a diffuser material should have a high transmissivity of the light wavelengths used; that is a low insertion loss, and have a negligible texture characteristic, to avoid a texture imprinted on the sensed image.

OBJECTS OF THE INVENTION

In any film scanning system it is desirable to have a uniform illumination intensity across the area of interest. Hence in the diffusion process it is required that the scattering of the specular light is equal in all directions.

The invention has as its object to provide a diffuser which can satisfy some or all of the desiderata set out above.

An object of the invention is to provide a microlithographic laminate as a diffuser.

It is a further object of the invention to provide a scanner which includes a microlithographic laminate diffuser.

It is a further object of the invention to provide a telecine including a microlithographic diffuser laminate.

SUMMARY OF THE INVENTION

The invention provides a film scanner comprising a light source for illuminating film to be scanned, a film plane in which film to be scanned is arranged, a condenser having at least one collimating lens arranged in a light path between the light source and the film to provide a collimated beam of light, a diffuser arranged in the light path adjacent the film to diffuse the collimated beam of light prior to the film, and at least one photodetector arranged to detect light passed by the film, characterised in that the diffuser is a microlithographic diffuser laminate.

The invention also provides a film scanner comprising a light source for illuminating film to be scanned, a film plane in which film to be scanned is arranged, a condenser having at least one collimating lens and a filter arranged in a light path between the light source and the film to provide a collimated beam of light having a predetermined spectral characteristic, a microlithographic diffuser laminate arranged in the light path adjacent the film to diffuse the filtered collimated beam of light prior to the film, and at least one photodetector arranged to detect light passed by the film.

The invention further provides a film scanner comprising a light source for illuminating film to be scanned, a film plane in which film to be scanned is arranged, a condenser having at least one collimating lens arranged in a light path between the light source and the film to provide a collimated beam of light, a microlithographic diffuser laminate arranged in the light path adjacent the film to diffuse the collimated beam of light prior to the film, a set of red, green and blue photodetectors arranged to detect light passed by the film and means for splitting the light passed by film in the film plane into red, green and blue components and for directing those components to the respective photosensor.

The invention still further provides a telecine including a scanner according to any aspect of the invention defined above.

Embodiments of the invention have the advantage of a low insertion loss and a negligible texture characteristic while providing a uniform illumination intensity across the film.

Diffusers embodying the invention have the advantage of requiring relatively simple condenser systems and relatively low powered light while introducing diffusion without the diffusing structure being visible in the recorded image.

Preferably the microlithographic diffuser laminate includes a substrate having an image imprinted thereon. The imprinted image may be selected to compensate for variations in the light path between the light source and the microlithographic laminate and may have a characteristic which is the inverse of a light level variation incident on the diffuser, such as an anti-gaussian filter characteristic.

Alternatively the image imprinted on the substrate may be a test pattern or chosen to produce a desired special effect on the scanned output.

Preferably the microlithographic diffuser laminate is mounted on a removable slide. A plurality of slides may be provided each having a different diffusion characteristic.

We have appreciated that the process of diffusing the incident light results in a lowering of the contrast range in the resultant sensed image. Embodiments of the invention have the advantage that they can be produced in various grades so that the amount of diffusion produced could be controlled. Thereby the diffuser material can also be used to produce a desired 'look' to the image. For example, a very low diffusion produces a high contrast 'look', a medium diffusion produces the normal 'look', and a very high diffusion produces a soft focus 'look', albeit in the latter case the image focus would not have changed. In a preferred embodiment a particular diffuser is selected, say by changing a diffuser slide on the host scanner, to allow the degree of scratch and blemish concealment to be selected for a particular film being scanned, i.e. badly damaged film using greater diffusion ratio than that necessary for less damaged film. The loss of contrast range with greater light diffusion can be compensated by an increase in incident light power but also may be compensated by using a longer exposure in the scanner itself, for example with a CCD scanner using a longer integration time with the CCDs by means of a slower scan rate. Film scanners such as described in our co-pending application GB 9401907 and our corresponding United States application filed 1st Feb. 1995, Ser. No. 08/382,361, allow the rate at which the film is traversed past the slit optics to be reduced thereby allowing each scanned line to have a longer light exposure which can increase the charge accumulated in the CCD, at each pixel site, before the data is clocked out of the CCD. Such a process of greater light integration allows an effective increase of signal to noise ratio of the resultant electrical signal.

An increase in incident light power can be effected in a number of ways. The power into the light source may be manually increased until the desired film exposure is achieved. The effective aperture of the optics may be increased, for example by decreasing the f number, that is, increasing the relative aperture, of the imaging lens . A mechanical iris on the light source itself may be varied to increase the emergent light in the rest of the light path. Automatic light level control systems such as disclosed in U.S. Pat. No. 5,155,596 entitled "Film scanner Illumination System having an Automatic Light Control", may also be used.

The invention has the further advantages that microlithographic laminate diffusers are of low cost, are easily manipulated to fit the application, are durable commensurate with the host product longevity, and with negligible ageing changes.

Thus, diffusers embodying the invention have the following advantages:
 low granularity/texture
 low optical losses
 homogeneity
 selectable diffusion characteristics
 ease of application fabrication
 durable and low ageing characteristics
 inexpensive

DESCRIPTION OF BEST MODE

Figure 1:
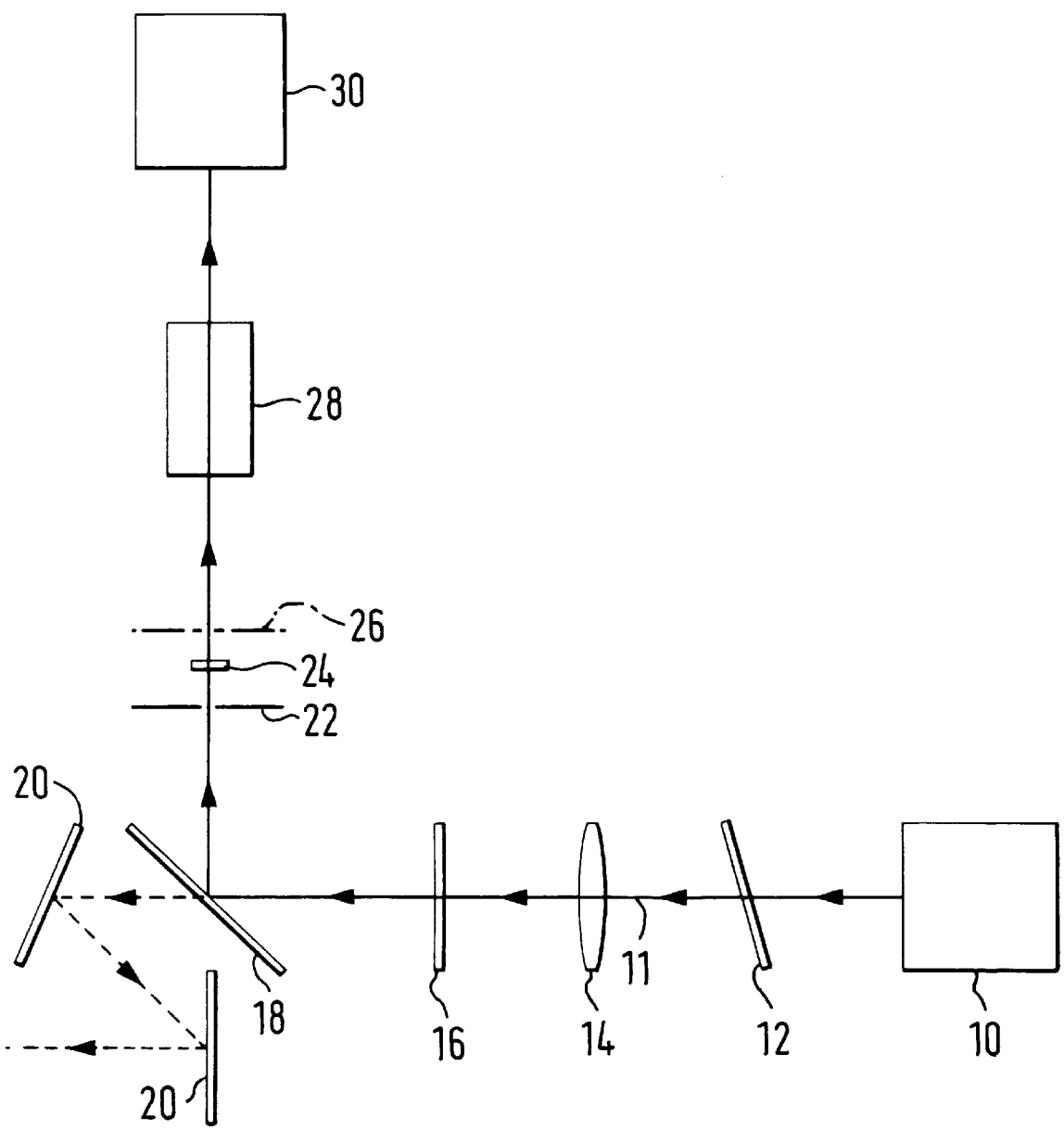
FIG. 1 is a block schematic diagram of a scanner embodying the invention.

In the various embodiments of film scanners and telecines illustrated in the drawings, elements such as film spools, servo systems and image processing electronics have been omitted for clarity. These elements are well known to those skilled in the art and are not necessary for an understanding or implementation of the invention. In the film scanner light source to photosensor arrangement of FIG. 1 a light source 10 is provided which has the required spectral characteristics and intensity. For example, the light source may be a Quartz Halogen lamp of 250 Watts power. Light from the light source passes through the condenser optics along a light path 11 commencing with a hot mirror 12 arranged in line with the output of the light source. The mirror 12 reflects and absorbs the Infra-Red (greater than 800 nm wavelength) heat energy from the light source and stops the Ultra-Violet (less than 400 nm wavelength) light. A collimating lens 14 is arranged to collect the available light passed by the hot mirror 12 and to form it into a beam of parallel rays. The collimating lens may, for example, be a convex lens. The parallel beam produced by the collimating lens is passed through a filter 16 to transmit light of the desired spectral characteristic. Filter 16 may be a filter wheel having a Red 650 nm, a Green 540 nm and a Blue 450 nm filter. A cold mirror 18 in the path of the filtered parallel beam of light reflects the visible spectrum light but transmits residual infra-red energy via a pair of reflecting mirrors 20 to a heat dump. Light reflected by the cold mirror passes through mechanical slit optics 22 and falls on a diffuser 24 which forms a uniform illumination narrow beam of light for illuminating the film 26. The light emerging from the film is collected by an imaging lens 28, which may for example, be a Nikon Nikkor 105 mm lens, which images the film information onto the photosensor or photosensors 30. An example of a suitable photosensor is a 4096 element Charge Coupled Device (CCD) line array such as the Dasa IL-C7-4096 Turbosensor.

A suitable diffuser which meets the requirements discussed in the introduction is Microlithographic Diffusion Laminate, developed by Leicester Polytechnic (now called DeMontfort University), and commercially sold by Leicester Expertise Limited, in association with the Nashua Corporation.

Figure 2:
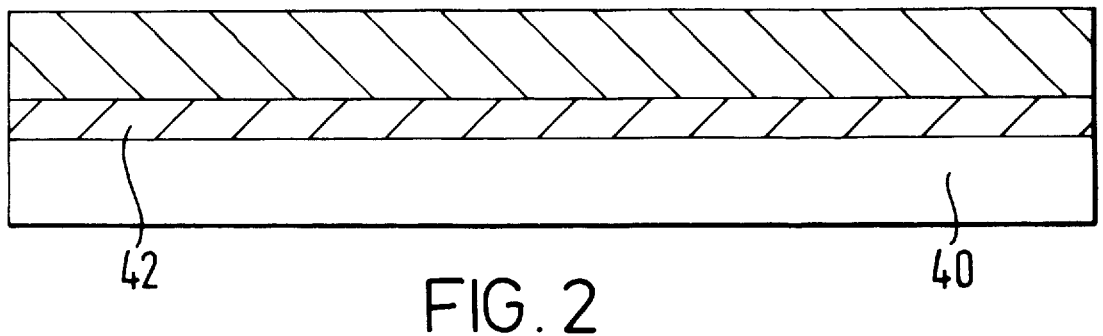
FIG. 2 is a schematic diagram of a diffuser embodying the invention.

Referring now to FIG. 2, the microlithographic diffuser is made in two stages. First, an optical mask 42 is created by forming a lithographic image of a suitable glass diffuser on a photoresist coated surface or substrate 40. This mask is then placed in contact with a polymer material 44 and the assembly exposed to intense incoherent UV light. Monomer migrates from the exposed area creating a two dimensional array of graded refractive index (GRIN) lens. The resulting structure will guide light via total internal reflection, thus creating diffusion of light incident on it at the same angle as the exposing light and transmitting light straight through which is outside this angle. The ability to tailor the acceptance angle of the diffuser to match that of the incoming light from the condenser system in the scanner makes the microlithographic diffuser particularly suitable.

The Microlithographic Diffusion Laminate material was originally developed for use as a diffuser with Liquid Crystal Displays (LCD). It is an inexpensive printed and etched film laminate which is easily manipulated during application manufacturing processes, has an 85–95% transmission of visible light dependent upon the degree of diffusion used, it has a 0.5–1 μm granular structure and a uniform homogeneity. The material is available in a variety of forms offering a range of diffusion characteristics.

Figure 3:
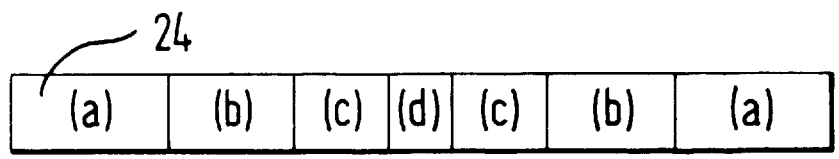
FIG. 3 shows possible images which may be imprinted on the diffuser of FIG. 2.

The Microlithographic Diffusion Laminate material includes a film substrate which lends itself to having an image imprinted upon it. An application for such an image imprinting could be to compensate for light level variation across the slit of light by imprinting an inverse characteristic on the diffuser film substrate. By way of example this could be an Anti-Gaussian filter characteristic. This is just one example of including a fixed image built in to the diffuser laminate. Other effects, test patterns and light variation compensation applications are possible and will occur to those skilled in the art. FIG. 3 shows an example of a diffuser with a density gradation image. The diffuser 24 is subdivided into seven areas. The areas labelled (a) are clear, those labelled (b) are 0.1 neutral density, those labelled (c) are 0.2 neutral density, and those labelled (d) are 0.3 neutral density.

The diffuser film laminate 24 is placed immediately prior to the film 26 being scanned which has the advantage that it acts as a safety barrier between the light and the valuable film 26 such that if the scanner mechanism should fail leaving the film 26 stationary for a long period in a high intensity light beam then the diffuser film laminate 24 will absorb the heat energy before any damage can be caused to the image film 26.

Figure 4:
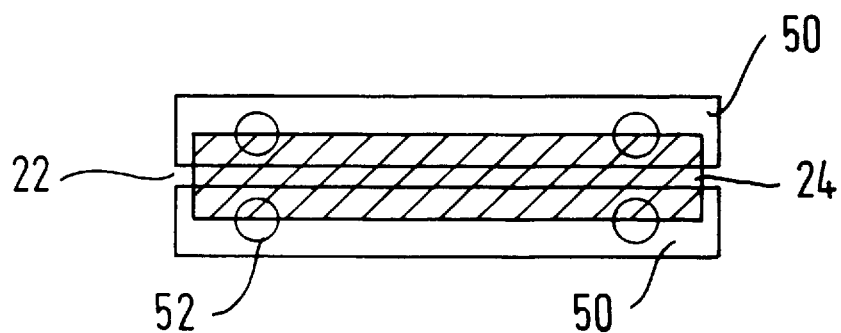
FIG. 4 is a schematic diagram showing the diffuser of FIG. 3 mounted as a slide.

As a number of different diffuser slides may be used, each of which has an individual characteristic, means are provided to vary the intensity of the light source to that suitable for a particular diffuser slide. The rate at which film is scanned may also be varied according to the characteristics of a particular diffuser slide. An example of a diffuser slide is shown in FIG. 4. The slide is mounted on the film side of the slit optics. In FIG. 4 the slit is defined by a pair of adjustable plates 50. The diffuser is attached to each of the plates by a mounting fixture or locating means 52. In the figure, a pair of mounting fixtures is provided on each plate 50 and the diffuser is arranged to lie across the plates behind the slit, so that the diffuser is attached to the plates at four points. Other mounting arrangements are possible.

The invention has been described in the context of a film scanner such as described in GB-A-9401907.2. However, the invention is not constrained exclusively to such a film scanner but may be applied to any film scanning method and application either scanning in real time or in non-real time. In this context real time refers to scanning movie film at approximately the exposure rate of 24 or 30 frames a second, or faster, such that the film scanning rate is at least equal to the television transmission rate, and non-real time refers to scanning the film at rates slower than the original film exposure rates. At present with very high resolution film scanners it is not possible to scan at a rate faster than the original film exposure rate, assuming 24 or 30 fps exposure, but the invention will be applicable to these faster than real time scanners when they become available. An example of such a device at 625/50 standard definition television would be a telecine which scans film which was shot at 24 fps at 25 or 30 fps.

The invention described can be used with any gauge, or format, of film, for example 16 mm or 35 mm, and with developed film at any of its prime, secondary or final stages, for example the negative, intermediate positive, and print stages. The invention may also be used with any generic film stock be it monochrome, colour, X-ray sensitive, Infra-red sensitive, radiation sensitive etc.

The invention can be used with any film scanning device which employs either one or a multiplicity of electrical sensing devices (photosensors) to detect the light emerging from the film. Whilst the embodiment described is intended for use with scanning colour film; those skilled in the art will understand that the invention is equally applicable to other film scanning arrangements.

The embodiment described uses either single or multiple line array CCD sensors. As alternatives, the sensor may be an area array CCD/photodiode sensor. In such a sensor no slit optics are used and the image is sensed directly or via relay optics and/or a prism depending on the particular arrangement used with the scanner.

Figure 5:
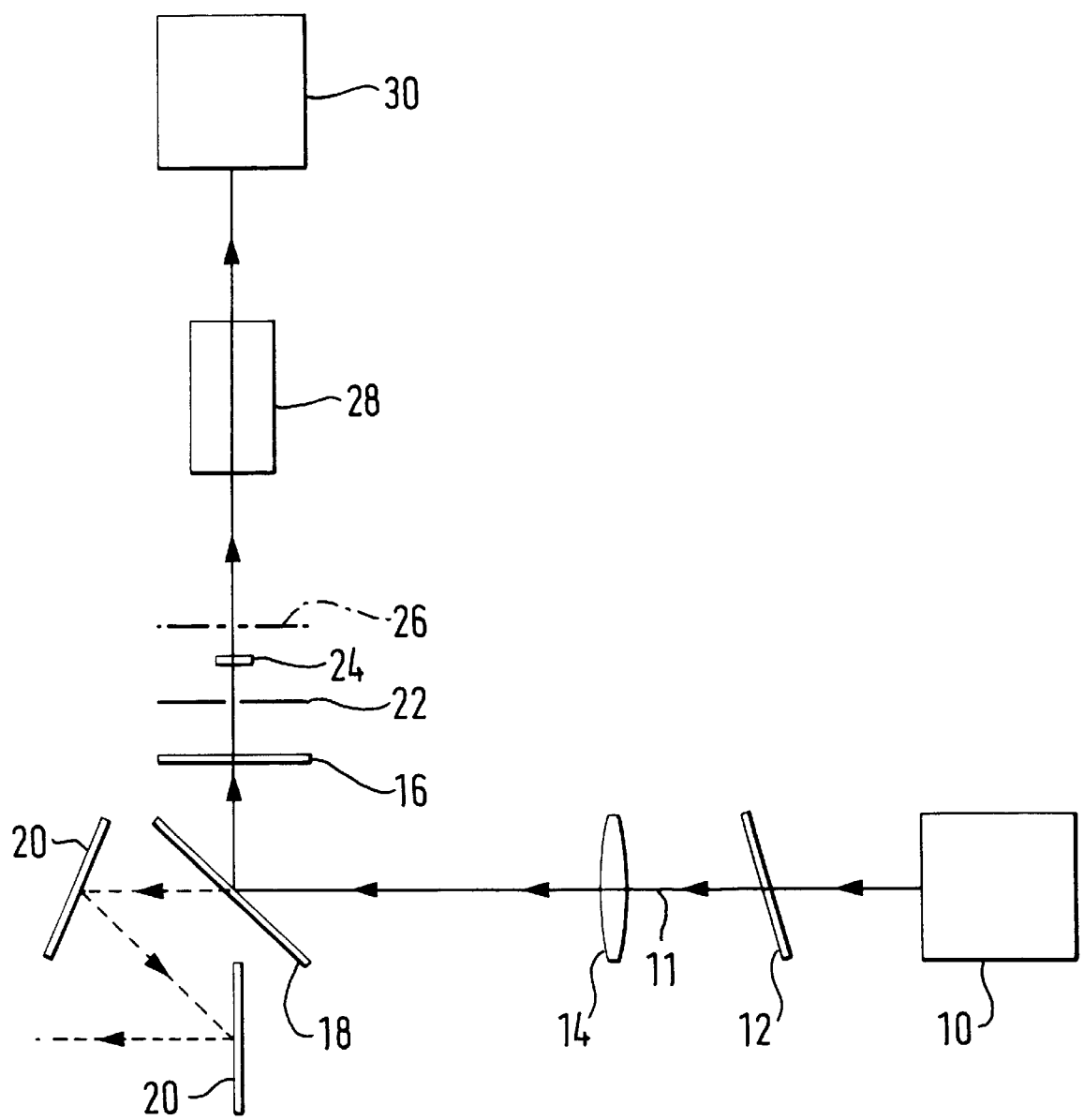
FIG. 5 is a block schematic diagram showing a modification to the scanner of FIG. 1.

A number of modifications and variations to the scanner described are shown in FIGS. 5 to 8. In FIG. 5 the RGB filter 16 has been repositioned to be between the mirror 18 and the slit 22. It will be appreciated that the mirrors 18 and 20 are not essential to any of the embodiments and that a straight light path between the light source and the camera is possible, in which case the embodiments of FIGS. 1 and 5 would be identical.

Figure 6:
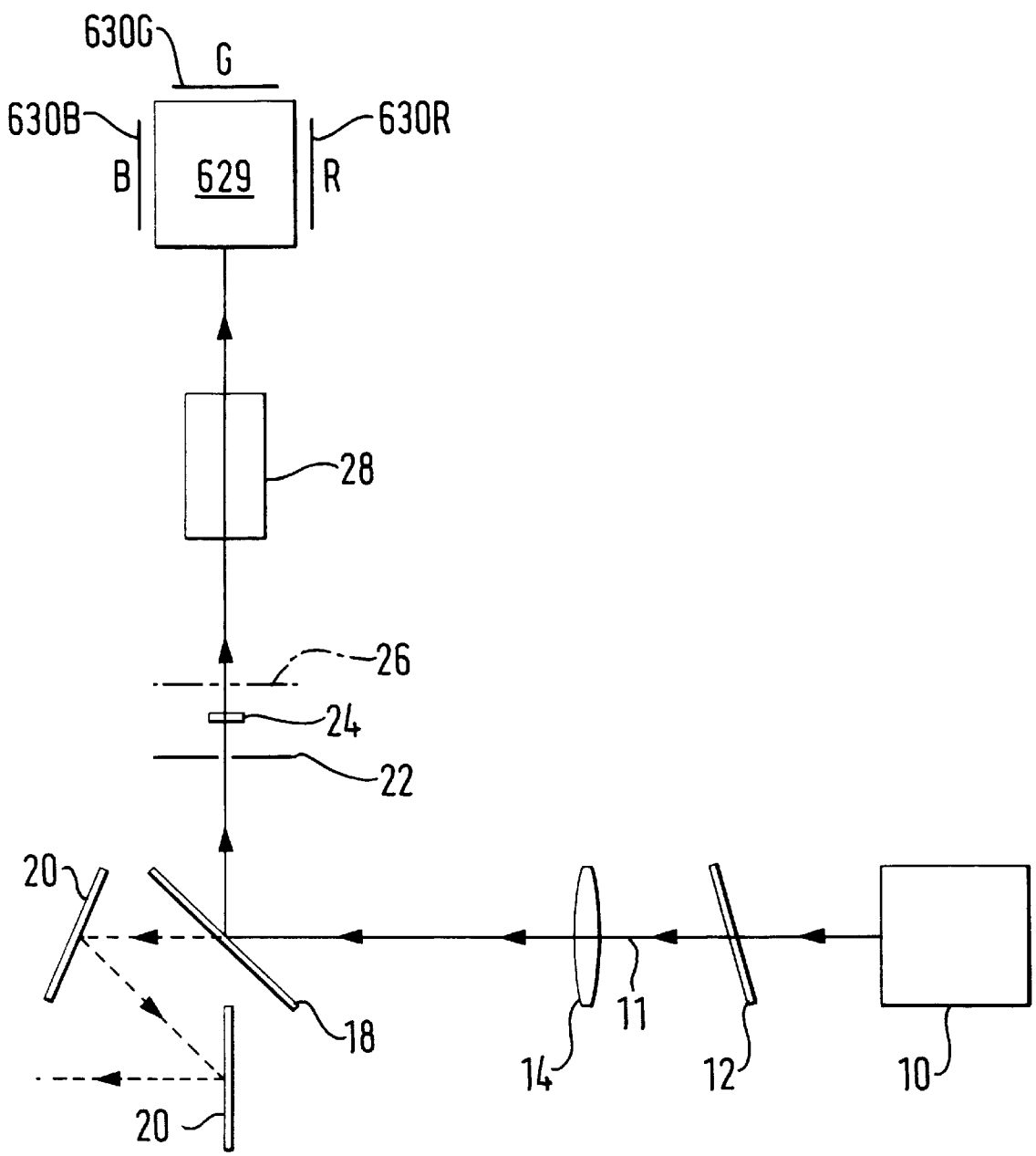
FIG. 6 is a block schematic diagram of a prism scanner embodying the invention.

In FIG. 6 the single line array CCD camera has been replaced by a multiple line array and prism splitter arrangement. Separate CCD sensors 630R, 630G, 630B are provided for each of the R, G and B primary colours and light passed by the film is separated by a prism splitter 629 and directed to the appropriate sensor. In this embodiment there is no need for a colour filter anywhere in the light path and the film is illuminated with white light.

Figure 7:
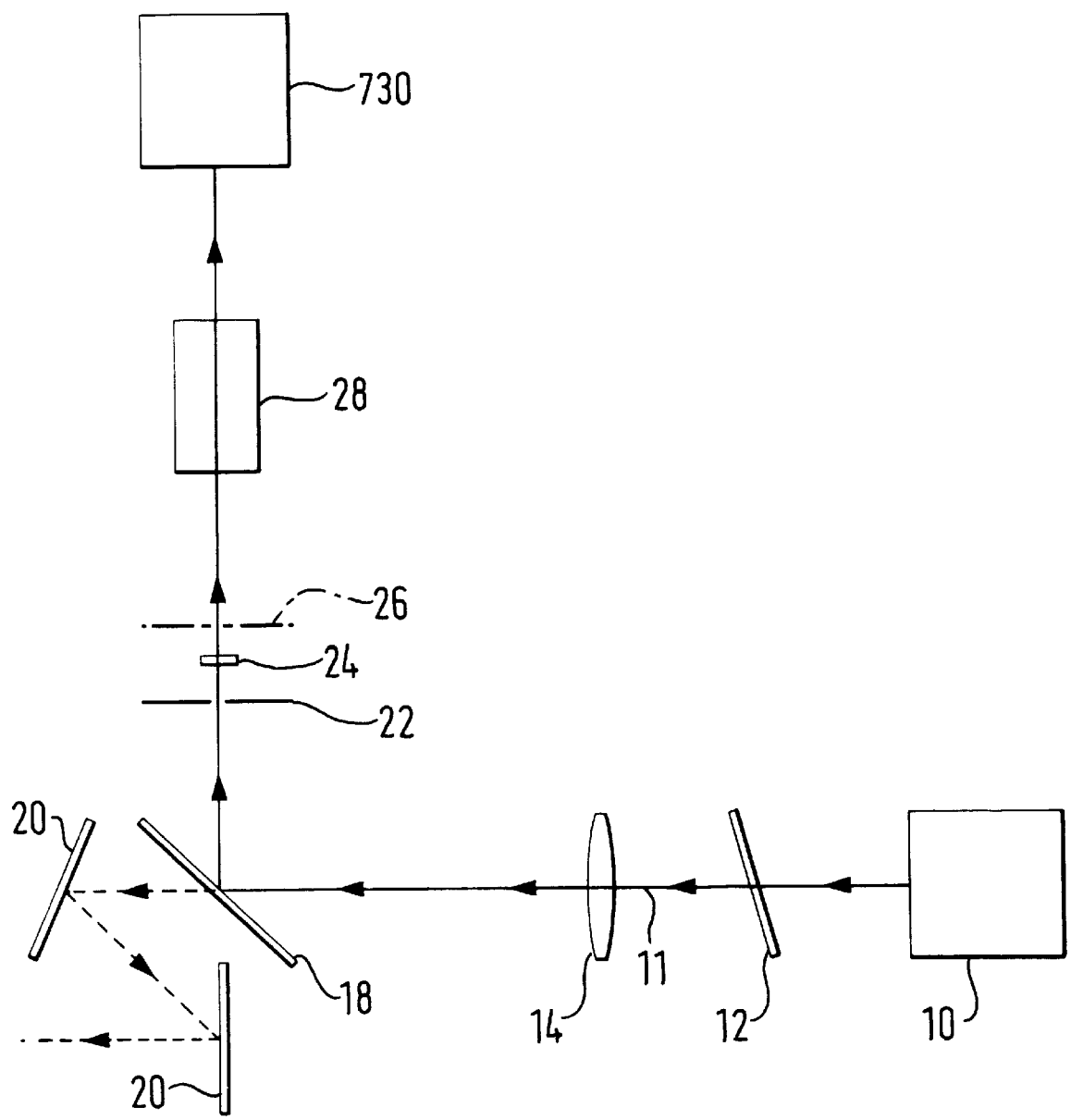
FIG. 7 is a block schematic diagram of a tri-linear array scanner embodying the invention.

In FIG. 7 the prism splitter arrangement is replaced by a tri-linear array camera 730 in which three equally spaced or pitched CCD line arrays are used to sense the light. One array has a red filter attached, one a green and the other a blue filter. Tri-linear arrays are available from the Eastman-Kodak Corp. and used in their Genesis (tm) very high resolution film scanner and also used by BTS Broadcast Television Systems GmbH of Darmstadt Germany in their FLH 1000 HDTV telecine.

Figure 8:
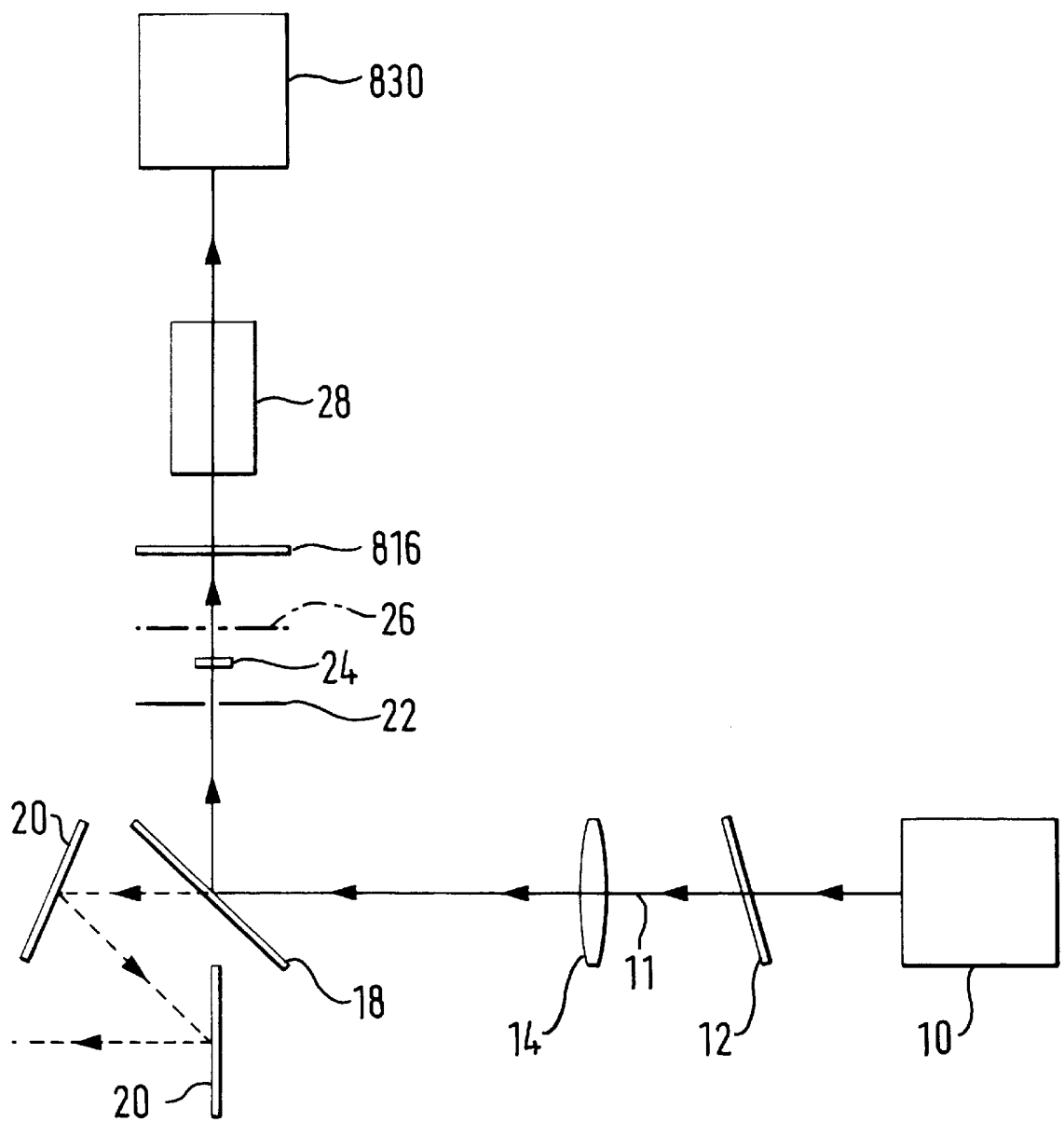
FIG. 8 is a block schematic diagram of a scanner showing how the colour filters may be arranged after the film.

The embodiments described which require a colour filter in the film path have had that filter in the light path before the film. This need not be the case. In the embodiment of FIG. 8 the filter is arranged after the film plane.

Figure 9:
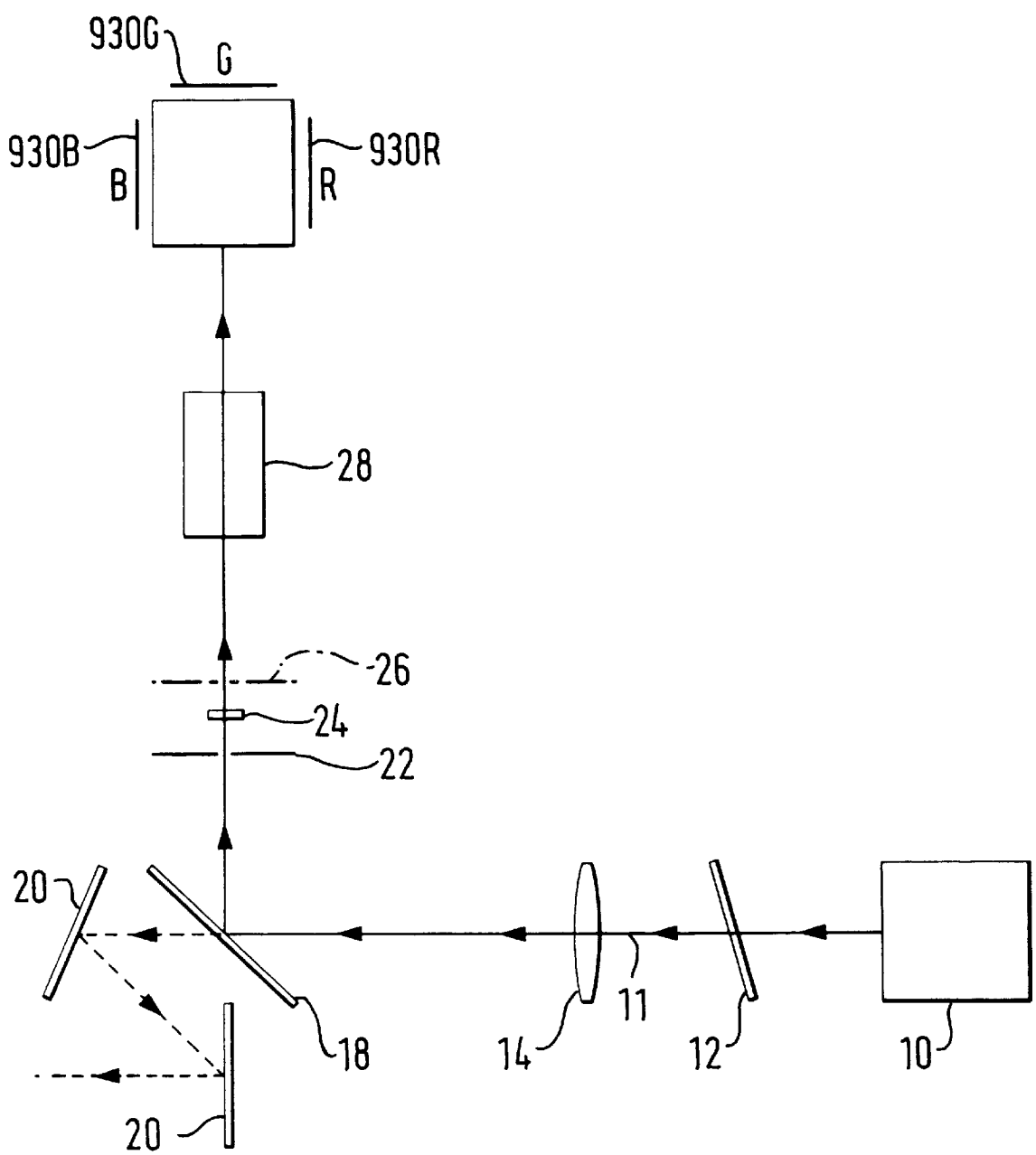
FIG. 9 is a schematic block diagram of a line array telecine embodying the invention.

Finally FIG. 9 shows how the invention may be applied to a telecine. The arrangement is very similar to that of FIG. 6, the telecine illustrated being a CCD line array telecine which uses separate R, G, and B line array sensors 930R, 930G and 930B each of which receive light of the appropriate wavelength transmitted through the film via a prism splitter 929 arranged in the light path between the imaging lens and the line arrays. The prism splitter and line array arrangement are well known in the art as exemplified by the Rank Cintel ADS 2 telecine. Those skilled in the art will appreciate that the invention is equally applicable to other types of telecine such as telecines using tri-state array scanners, area array scanners or any of the other scanner arrangements described above or known to those in the art.

What we claim is:

1. A film scanner comprising:
   a light source for illuminating film to be scanned;
   a film plane in which film to be scanned is arranged;
   a condenser having at least one collimating lens arranged in a light path between said light source and said film to provide a collimated beam of light;
   a microlithographic diffuser laminate arranged in said light path adjacent said film to diffuse said collimated beam of light prior to said film;
   and at least one photodetector arranged to detect light passed by said film.

2. The film scanner of claim 1, further comprising a colour filter arranged in said light path between said light source and said at least one photodetector.

3. The film scanner of claim 2, wherein said colour filter comprises a filter wheel including red green and blue filters.

4. The film scanner of to claim 2, wherein said colour filter is arranged after said film plane.

5. The film scanner of claim 2, wherein said colour filter is arranged before said film plane.

6. The film scanner of claim 1, wherein said film is scanned in non-real time.

7. The film scanner of claim 1, wherein said microlithographic diffuser laminate includes a substrate having an image imprinted thereon.

8. The film scanner of claim 7, wherein said image imprinted on said substrate has a characteristic the inverse of the light level variation incident on said diffuser.

9. The film scanner of claim 7, wherein said image imprinted on said substrate compensates for variations in said light path between said light source and said microlithographic laminate.

10. The film scanner of claim 7, wherein said image imprinted on said substrate is a test pattern.

11. The film scanner of claim 7, wherein said image imprinted on said substrate is chosen to produce a desired special effect on said scanned output.

12. The film scanner of claim 1, wherein said microlithographic diffuser laminate is mounted on a removable slide.

13. The film scanner of claim 1, comprising a plurality of interchangeable microlithographic diffusion laminates, each applying a different diffusion characteristic.

14. The film scanner of claim 13, comprising a light source intensity varying device arranged to vary the intensity of the light source in accordance with said characteristic of said diffusion laminate.

15. The film scanner of claim 13, comprising a device for varying the rate at which film is scanned in accordance with said characteristics of said diffusion laminate.

16. A film scanner comprising:
   a light source for illuminating film to be scanned;
   a film plane in which film to be scanned is arranged;
   a condenser having at least one collimating lens and a filter arranged in a light path between said light source and said film to provide a collimated beam of light having a predetermined spectral characteristic;
   a microlithographic diffuser laminate arranged in said light path adjacent the film to diffuse said filtered collimated beam of light prior to said film; and
   at least one photodetector arranged to detect light passed by said film.

17. The film scanner of claim 16, wherein said film is scanned in non-real time.

18. The film scanner of claim 16, wherein said microlithographic diffuser laminate includes a substrate having an image imprinted thereon.

19. The film scanner of claim 18, wherein said image imprinted on said substrate compensates for variations in said light path between said light source and said microlithographic laminate.

20. The film scanner of claim 18, wherein said image imprinted on said substrate has a characteristic the inverse of the light level variation incident on said diffuser.

21. The film scanner of claim 20, wherein said inverse characteristic is an anti-gaussian filter characteristic.

22. The film scanner of claim 18, wherein said image imprinted on said substrate is a test pattern.

23. The film scanner of claim 18, wherein said image imprinted on said substrate is chosen to produce a desired special effect on said scanned output.

24. The film scanner of claim 16, wherein said microlithographic diffuser laminate is mounted on a removable slide.

25. The film scanner of claim 16, comprising a plurality of interchangable microlithographic diffusion laminates, each applying a different diffusion characteristic.

26. The film scanner of claim 25, comprising means for varying the intensity of said light source in accordance with said characteristic of said diffusion laminate.

27. The film scanner of claim 25, comprising means for varying the rate at which film is scanned in accordance with said characteristics of said diffusion laminate.

28. The film scanner of claim 1,
wherein said at least one photodetector comprises a set of photodetectors arranged to detect red, green and blue light passed by said film; and
means for splitting said light passed by film in said film plane into red, green and blue components, and for directing those components to a respective photodetector of said set of photodetectors.

29. The film scanner of claim 28, wherein said set of photodetectors comprise charge coupled device (CCD) line arrays, and said splitting and directing means comprises a prism splitter.

30. The film scanner of claim 28, wherein said set of photodetectors comprises a tri-linear array charge coupled device (CCD) sensor and said splitting and directing means comprises red, green and blue filters arranged in front of the tri-linear array.

31. The film scanner of claim 28, wherein said film is scanned in non-real time.

32. The film scanner of claim 28, wherein said microlithographic diffuser laminate includes a substrate having an image imprinted thereon.

33. The film scanner of claim 32, wherein said image imprinted on said substrate compensates for variations in said light path between said light source and said microlithographic laminate.

34. The film scanner of claim 28, wherein said microlithographic diffuser laminate is mounted on a removable slide.

35. The film scanner of claim 28, comprising a plurality of microlithographic diffusion laminates, each having a different diffusion characteristic.

36. The film scanner claim 1,
wherein said at least one photodetector comprises a set of photodetectors arranged to detect red, green and blue light passed by said film;
a light splitter for splitting said light passed by film in said film plane into red, green and blue components; and
a light director for directing those components to a respective photodetector of said set of photodetectors.

37. A telecine comprising:
the film scanner of claim 1;
a film transport for guiding said film to be scanned so that said film passes said film plane.

38. The telecine of claim 37, wherein images or data recorded on film are scanned and converted into video signals in real time.

39. A telecine comprising:
the film scanner of claim 16;
a film transport for guiding said film to be scanned so that said film passes said film plane.

40. The telecine of claim 39, wherein images or data recorded on film are scanned and converted into video signals in real time.

41. A telecine comprising:
the film scanner of claim 28;
a film transport for guiding said film to be scanned so that said film passes said film plane.

42. The telecine of claim 41, wherein images or data recorded on film are scanned and converted into video signals in real time.

43. The film scanner of claim 1, further comprising an optical slit arranged in said light path before said diffuser.

44. The film scanner of claim 43, wherein said microlithographic diffuser laminate diffuses the collimated beam of light passing through said optical slit so as to improve film scanning by reducing the visibility of said slit and of scratches and blemishes on the film.

45. The film scanner of claim 16, further comprising an optical slit arranged in said light path before said diffuser.

46. The film scanner of claim 45, wherein said microlithographic diffuser laminate diffuses the collimated beam of light passing through said optical slit so as to improve film scanning by reducing the visibility of said slit and of scratches and blemishes on the film.

47. The film scanner of claim 1, wherein said microlithographic diffuser laminate diffuses the collimated beam of light before the film plane so as to improve film scanning by reducing the visibility of scratches and blemishes on the film.

48. The film scanner of claim 16, wherein said microlithographic diffuser laminate diffuses the collimated beam of light before the film plane so as to improve film scanning by reducing the visibility of scratches and blemishes on the film.

49. The film scanner of claim 28, further comprising an optical slit arranged in said light path before said diffuser.

50. The film scanner of claim 49, wherein said microlithographic diffuser laminate diffuses the collimated beam of light passing through said optical slit so as to improve film scanning by reducing the visibility of said slit and of scratches and blemishes on the film.

51. The film scanner of claim 36, further comprising an optical slit arranged in said light path before said diffuser.

52. The film scanner of claim 51, wherein said microlithographic diffuser laminate diffuses the collimated beam of light passing through said optical slit so as to improve film scanning by reducing the visibility of said slit and of scratches and blemishes on the film.

53. The film scanner of claim 28, wherein said microlithographic diffuser laminate diffuses the collimated beam of light before the film plane so as to improve film scanning by reducing the visibility of scratches and blemishes on the film.

54. The film scanner of claim 36, wherein said microlithographic diffuser laminate diffuses the collimated beam of light before the film plane so as to improve film scanning by reducing the visibility of scratches and blemishes on the film.

55. The film scanner of claim 36, wherein said set of photodetectors comprise charge coupled device (CCD) line arrays, and said light splitter comprises a prism splitter.

56. The film scanner of claim 36, wherein said set of photodetectors comprises a tri-linear array charge coupled device (CCD) sensor and said light splitter comprises red, green and blue filters arranged in front of the tri-linear array.

57. The film scanner of claim 36, wherein said film is scanned in non-real time.

58. The film scanner of claim 36, wherein said microlithographic diffuser laminate includes a substrate having an image imprinted thereon.

59. The film scanner of claim 58, wherein said image imprinted on said substrate compensates for variations in said light path between said light source and said microlithographic laminate.

60. The film scanner of claim 36, wherein said microlithographic diffuser laminate is mounted on a removable slide.

61. The film scanner of claim 36, comprising a plurality of microlithographic diffusion laminates, each having a different diffusion characteristic.

* * * * *

UNITED STATES PATENT AND TRADEMARK OFFICE
CERTIFICATE OF CORRECTION

PATENT NO.   : 5,847,754
DATED        : December 8, 1998
INVENTOR(S)  : Shane Thornton It is certified that error appears in the above-identified patent and that said Letters Patent is hereby corrected as shown below:

On the title page, Item [73], change the Assignee to:

--Cintel International Limited, United Kingdom--.

Signed and Sealed this

Twenty-ninth Day of June, 1999

Attest:

Q. TODD DICKINSON

Attesting Officer      Acting Commissioner of Patents and Trademarks